United States Patent
Olshanetsky et al.

(10) Patent No.: US 6,895,989 B2
(45) Date of Patent: May 24, 2005

(54) DYNAMIC LIQUID FUEL TRAP

(75) Inventors: Vladimir Olshanetsky, Beer Sheva (IL); Alexey Zarochintsev, Beer Sheva (IL); Ehud Orenstein, D.N. Halutza (IL)

(73) Assignee: Raval-Agriculture Cooperative Societies, Ltd., D.N. Halutza (IL)

( * ) Notice: Subject to any disclaimer, the term of this patent is extended or adjusted under 35 U.S.C. 154(b) by 0 days.

(21) Appl. No.: 10/413,514

(22) Filed: Apr. 15, 2003

(65) Prior Publication Data

US 2004/0206398 A1 Oct. 21, 2004

(51) Int. Cl.[7] .............................................. F16K 24/04
(52) U.S. Cl. ...................................... 137/202; 137/587
(58) Field of Search ................................. 137/202, 587

(56) References Cited

U.S. PATENT DOCUMENTS 6,182,693 B1   2/2001   Stack et al.

2003/0079775 A1 * 5/2003 Ehrman et al. ............. 137/202

FOREIGN PATENT DOCUMENTS

DE          100 52 399 A1 * 5/2002
WO          WO 02/070295 A    9/2002

* cited by examiner

Primary Examiner—Gerald A. Michalsky
(74) Attorney, Agent, or Firm—Birch, Stewart, Kolasch & Birch, LLP.

(57) ABSTRACT

A fuel trap for a vehicle's fuel system, the liquid fuel trap comprises a housing adapted for fitting within the vehicle's fuel tank and at least one fuel fluid inlet port connectable to a fuel venting valve system, a gas outlet port connectable to a fuel vapor treating system; and a liquid fuel discharge assembly for discharging liquid fuel into the fuel tank, said liquid fuel discharge assembly fitted with a fluid propelling mechanism responsive to acceleration and buoyant forces, and to fuel motion within the fuel tank.

28 Claims, 13 Drawing Sheets

DYNAMIC LIQUID FUEL TRAP

FIELD OF THE INVENTION

The present invention is in the field of vehicle fuel systems and more specifically it is concerned with a Liquid Fuel Trap (LFT), at times referred to also as an expansion tank or an expansion canister.

BACKGROUND OF THE INVENTION

Vehicle fuel systems comprise, among other items, a fuel tank fitted with a filler neck, a variety of fuel valves, a tubing for supplying fuel to the ignition system and a fuel vapor treating system (e.g. an active carbon filter recovery system), collectively referred to herein after in the specification and claims as a canister, to which fuel vapor from the fuel tank flows and is then used for enriching the fuel mixture fed to the ignition system.

Fuel fluid (in the form of liquid, droplets, spray and vapor) from the fuel tank flows via the one or more valves, which are connected via suitable tubing, to a liquid trap intermediate the fuel vapor recovery system and the tank.

The liquid fuel tank (LFT) receives fuel fluid flowing from the fuel tank which flows at a relatively high velocity owing to pressure and temperature changes, and thus vapor flowing from the fuel tank carries along with it also a considerable amount of liquid fuel in the form of droplets (as a result of a venturi effect). The liquid trap entraps the liquid fuel and admits fuel vapor flow towards the vapor recovery system. The liquid fuel then returns back to the fuel tank, upon pressure decrease within the fuel tank.

A liquid fuel trap is important in those cases where the various valves fitted within the tank are internally installed, i.e. do not project from an upper wall of the tank, where siphons may be generated at tubes connecting the valves to the liquid trap. Such siphons interfere with venting the tank on the one hand and, on the other hand, interfere with draining of the devices.

Still another problem occurring with liquid fuel traps is that the pressure within the fuel tank decreases toward the canister owing to head loss over the different valving and tubing and where the canister outlet is at atmospheric pressure. Accordingly, in some instances, when the pressure within the LFT drops below the pressure within the fuel tank, the fuel trap may in fact drag liquid droplets from the fuel tank towards the canister owing to motion of the fuel within the fuel tank of a vehicle resulting in temperature increase, pressure increase and generation of vapor or droplets which may enter the liquid trap and flow toward the canister. Furthermore, the pressure difference between the LFT and the fuel tank requires suitable arrangements for progressively discharging liquid fuel back into the fuel tank, i.e. not relying on gravity forces but rather actively propelling the liquid fuel.

It is an object of the present invention to provide a liquid fuel trap (LFT) for a vehicle's fuel system, in which the expansion tank is made of a plastic material and is adapted for fitting within the fuel tank.

It is a primary object of the invention to provide such a liquid fuel trap wherein liquid is prevented from flowing into the expansion tank thereof to thereby prevent liquid flow toward the canister.

It is further an object of the disclosed invention to provide a liquid fuel trap (LFT) of the aforementioned type in which means are provided for actively propelling fuel vapor into the fuel trap, and optionally for actively discharging liquid fuel into the fuel tank, responsive to fuel motion within the fuel tank.

SUMMARY OF THE INVENTION

The objects of the present invention are met by providing a liquid fuel trap (LFT) mountable within a fuel tank and fitted with a fluid propelling system for drawing fuel fluid into the liquid fuel trap discharging liquid fuel back to the fuel tank, in an automated manner, responsive to acceleration and buoyant forces and to liquid motion within the fuel tank.

The present invention discloses a liquid fuel trap (LFT) usable in a vehicle's fuel system, which liquid fuel trap is adapted for fitting within the vehicle's fuel tank and comprises a fuel fluid inlet port connectable to a fuel venting valve system and a gas outlet port connectable to a fuel vapor treating system (canister); a liquid fuel discharge assembly for discharging liquid fuel into the fuel tank and a fluid propelling mechanism responsive to acceleration and buoyant forces, and to liquid motion within the tank.

The term 'fluid propelling' denotes drawing fluid and discharging liquid, into and from the liquid fuel trap, respectively and particularly, actively drawing liquid fluid fuel into the liquid fuel discharge assembly, and discharging liquid fuel, into the fuel tank, respectively.

The term 'liquid motion' as used herein the specification and claims denotes fuel waves imparted owing to acceleration/deceleration of the vehicle and resulting in lateral and elevational liquid fuel displacement within the fuel tank (e.g. also by tilt of the vehicle), thus giving rise to 'wash' and 'buoyant' forces applied on a motion pick-up member articulated to the fluid propelling mechanism.

The liquid fuel trap (LFT), according to an application of the invention, comprises a housing with a confined space and where the liquid fuel discharge assembly comprises one or more confined liquid fuel chambers, each fitted with a one-way inlet valve adapted to admit liquid flow from the confined space of the housing into said liquid chamber, and a one-way discharge valve adapted to admit liquid flow from said liquid chamber to the fuel tank; and a pump to propel the liquid, said pump being activated responsive to fuel motion within the tank and acceleration and buoyant forces.

Typically, but not necessarily, the one or more liquid fuel chambers extend at a bottom portion of the liquid fuel trap.

According to one particular design of the present invention, one or both of the one-way inlet valve and the one-way discharge valve are mushroom-type valves, and by other designs said valves are spring-biased, such as, for example, door-type valves, seat-type check valves, etc.

According to an embodiment of the invention liquid flow through the gas outlet port is barred (liquid fuel flowing or splashing towards said gas outlet port). This is obtained by prohibiting direct liquid flow between the fluid inlet port and the gas outlet port. By one specific design a barrier member is provided there between. Alternatively, a maze-like flow path or a multi chambered flow path, is provided between the fluid inlet port and the gas outlet port. Other alternatives are for example, fitting the gas outlet port directed upwardly or, the inlet port and the outlet port may extend at different levels and axially diverted.

The present invention calls also for a fuel system comprising a fuel tank, at least one venting valve, a fuel vapor recovery system and a liquid fuel trap LFT) device extending between the at least one venting valve and the fuel vapor recovery system; said liquid trap device comprising a housing formed with a confined space with at least one fuel fluid inlet port connectable to the at least one venting valve, a gas outlet port connectable to the fuel vapor recovery system, liquid fuel discharge assembly adapted for discharging liquid from said space into the tank, and a fluid propelling mechanism responsive to liquid motion within the tank adapted for drawing fluid into the confined liquid fuel chamber through the fuel fluid inlet port and discharging liquid through said liquid fuel discharge assembly.

According to a particular design, the liquid fuel trap according to the invention is adapted for fitting within the tank and thus, a connecting arrangement for attaching the device on an inner surface of an upper wall of the fuel tank is provided. For example, there may be a connecting member extending from the upper wall of the fuel tank, said connecting member adapted for engagement with a corresponding securing member formed on the housing of the device.

BRIEF DESCRIPTION OF THE DRAWINGS

In order to better understand the invention and to see how it may be carried out in practice, several embodiments will now be disclosed, with reference to the accompanying drawings, by way of example only, in which:

FIG. 2 are schematic representations of a Liquid Fuel Trap (LFT) according to a first embodiment of the present invention, in several positions, wherein:

FIG. 3 are schematic representations of a Liquid Fuel Trap (LFT) according to a second embodiment of the present invention, in several positions, wherein:

FIG. 8 are schematic representation of a Liquid Fuel Trap (LFT) according to still a different embodiment of the present invention, at two positions, wherein:

DETAILED DESCRIPTION OF THE INVENTION

Figure 1:
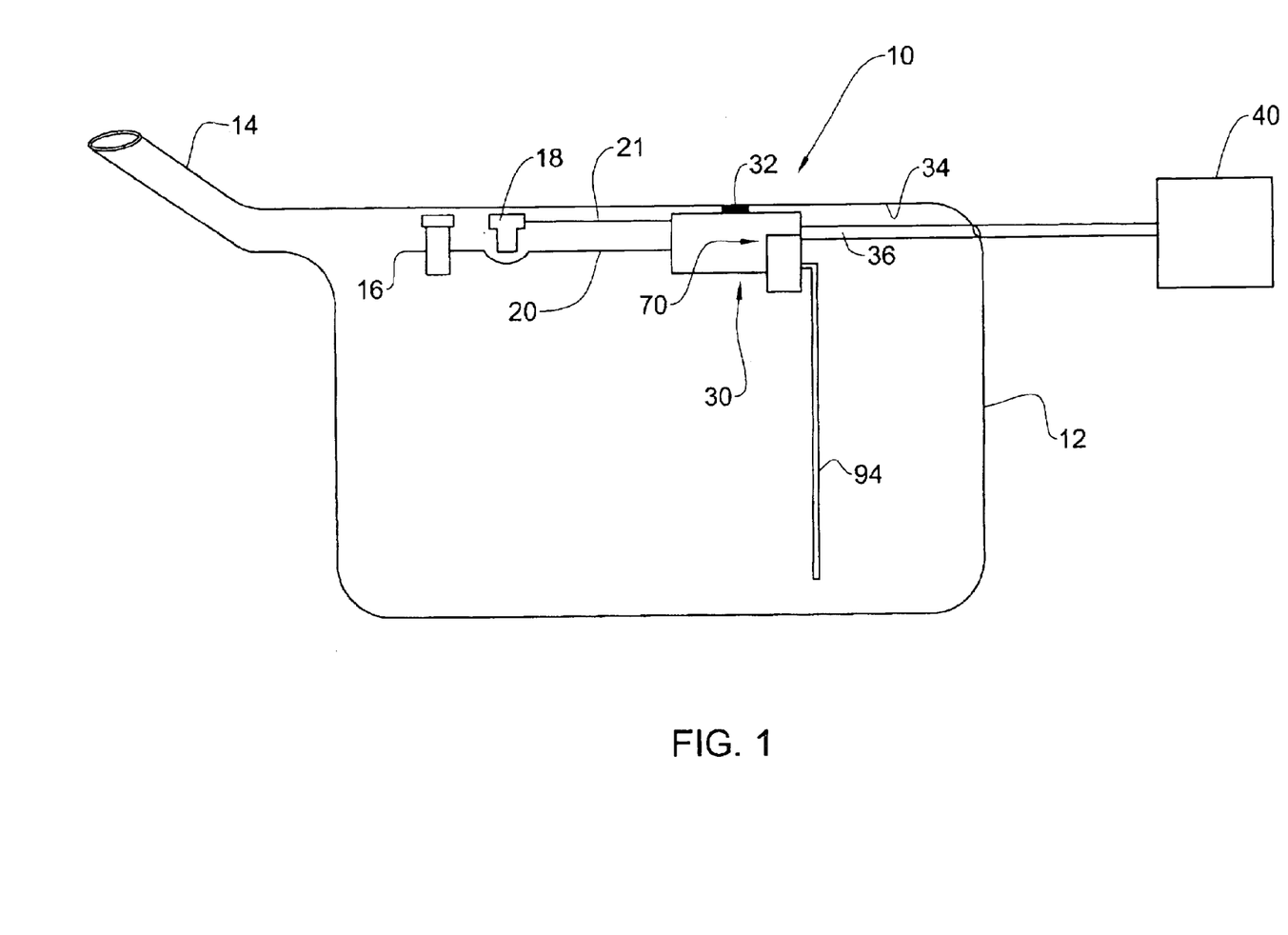
FIG. 1 is a schematic representation illustrating a vehicle's fuel system fitted with a liquid fuel trap according to the present invention.

FIG. 1 is a schematic illustration of a vehicle's fuel system generally designated 10 comprising several elements which are schematically illustrated, namely a fuel tank 12 fitted with a fueling pipe 14, several valves 16 and 18, e.g. a roll-over valve, over-filling interdiction valve and a variety or other valves are possible, as known per se. The valves 16 and 18 are connected via suitable tubing 20 and 21 to a liquid fuel trap device in accordance with the present invention generally designated 30, which in turn is connected at 32 to an inside surface of an upper wall 34 of the fuel tank 12.

Extending from the liquid fuel trap 30 there is a pipe 36 extending to a fuel vapor recovery system 40, typically a carbon fuel treating device known as a "canister".

Further attention is now directed to some particular embodiments as illustrated in FIGS. 2–10, by way of schematic representation.

Figure 2A:
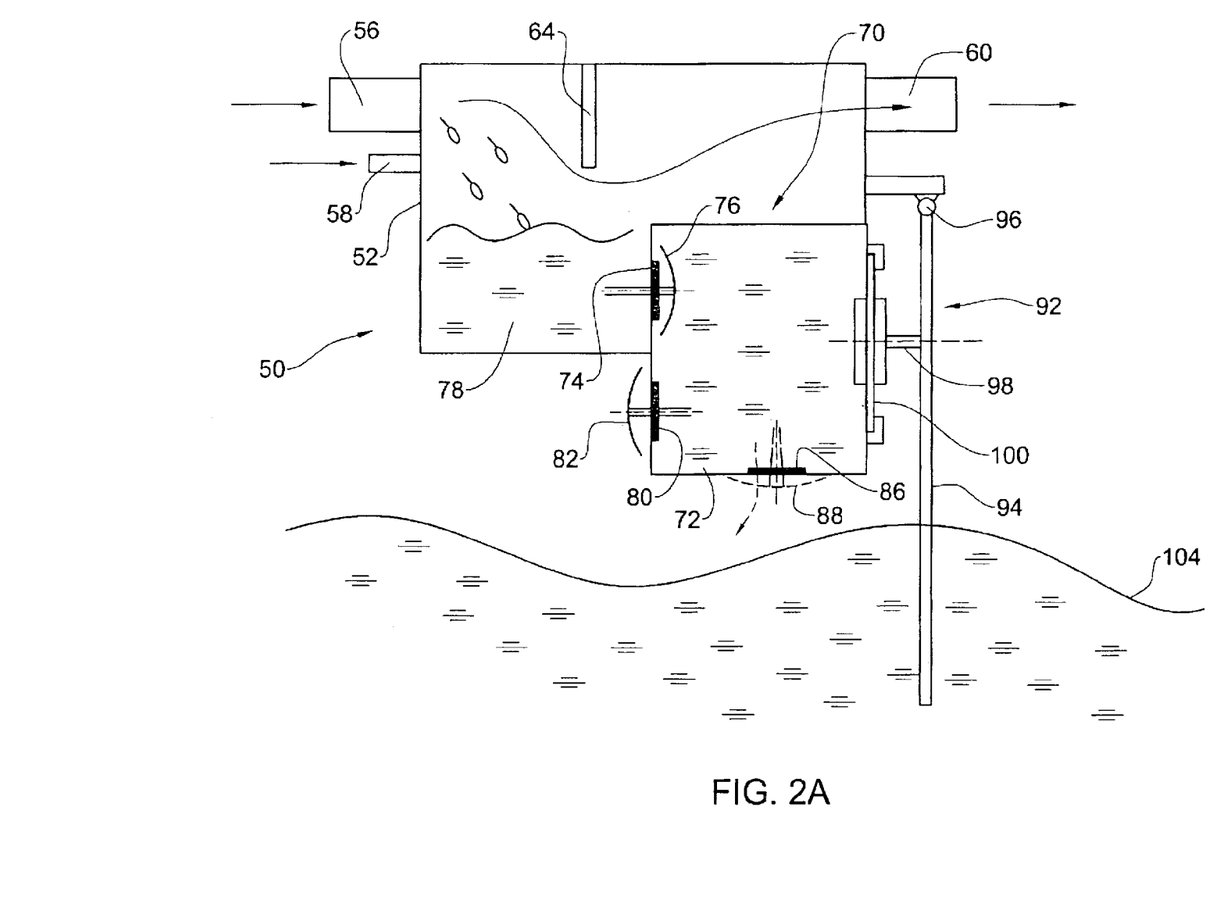
FIG. 2A illustrates the LFT at rest.
Figure 2B:
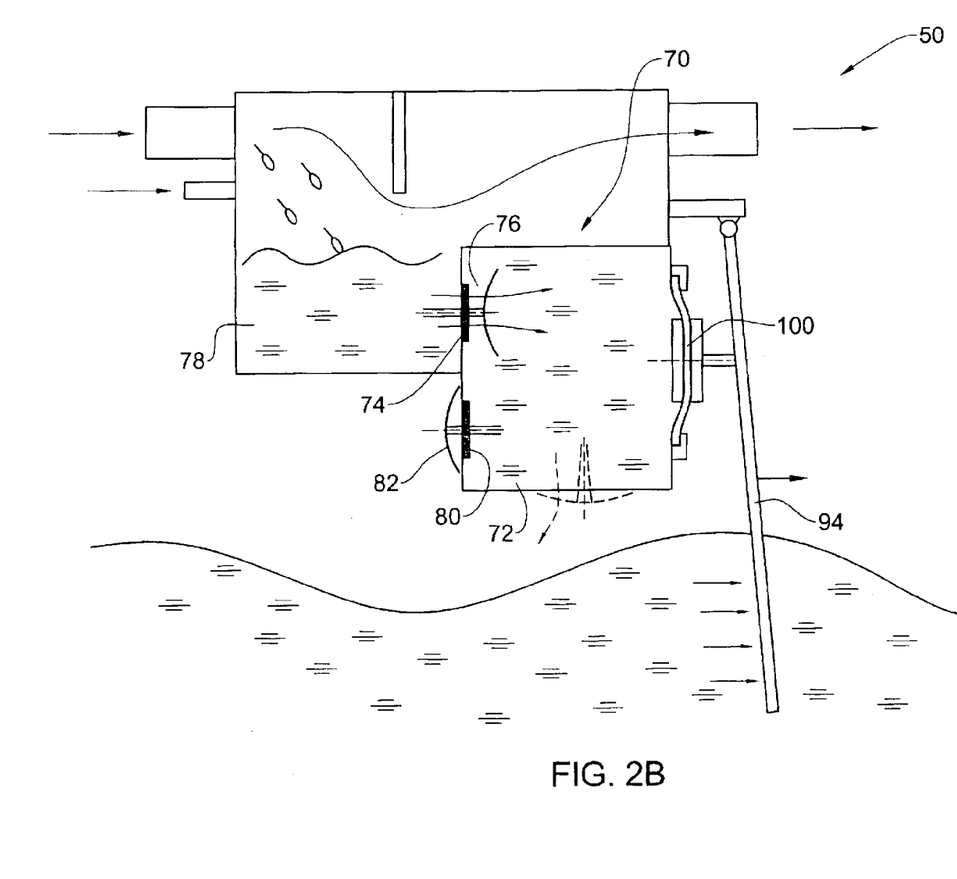
FIG. 2B illustrates the LFT at an intake position.
Figure 2C:
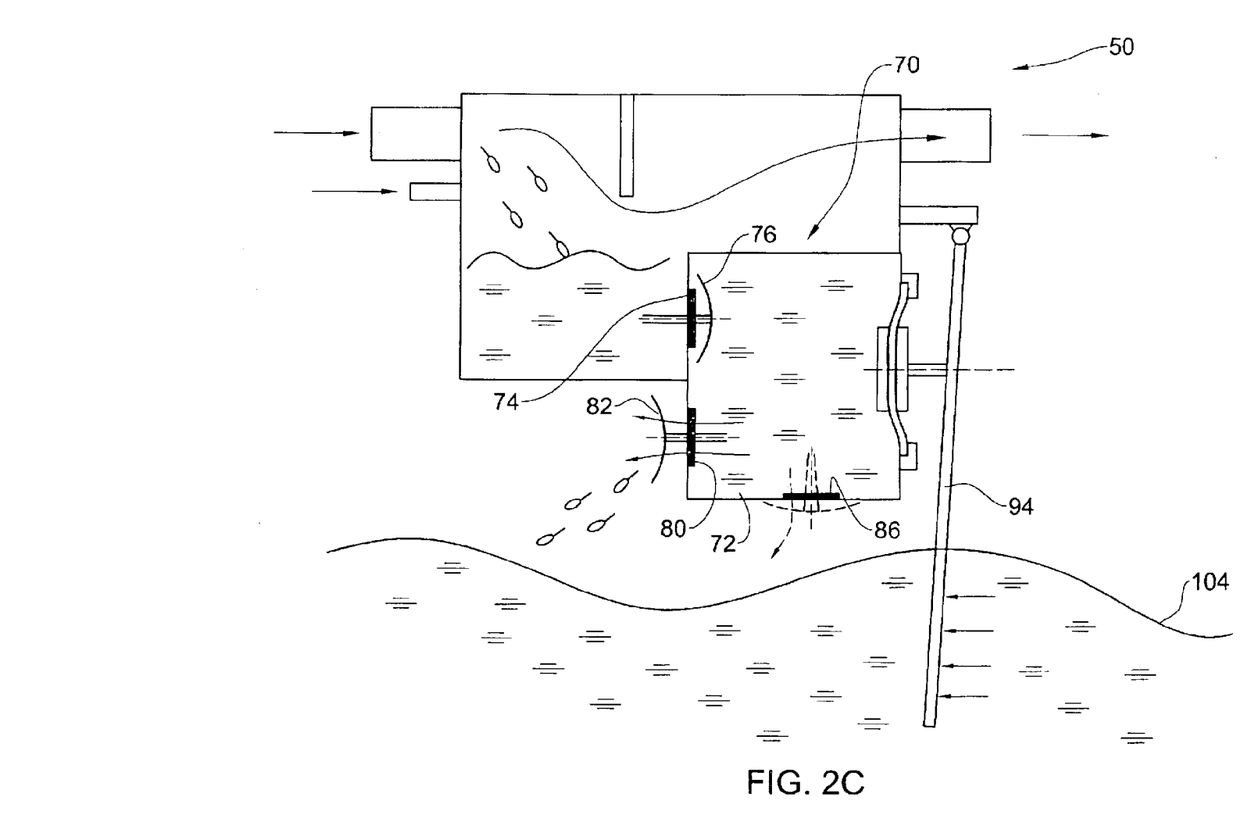
FIG. 2C illustrates the LFT at a discharge position.

With reference first being made to FIGS. 2A to 2C, there is illustrated a liquid fuel trap (LFT) generally designated 50 comprising a housing 52 typically made of an essentially impermeable material, though since the device is fitted for mounting within the fuel tank, this feature is not of essential importance. The housing 52 is fitted for attaching to a bottom surface of a top wall of the fuel tank (see FIG. 1). Such means may be for example map engagement fasteners, etc.

The housing 52 of the liquid fuel trap comprises a first fuel fluid inlet port 56 and a second fuel fluid inlet port 58 connectable to venting valves, e.g. a roll-over valve, an over-fitting interdiction valve, etc. (not shown). Housing 52 is further fitted with a gas outlet port 60 which is mentioned in connection with reference to FIG. 1 is connectable to a fuel vapor treating system ("canister" not shown).

Extending within the space of the housing 52, intermediate the fluid inlet ports 56 and 58 and the gas outlet port 60 there is a barrier wall 64 fitted to thereby prevent flow of fuel droplets between the fuel fluid inlet ports and the gas outlet port, to thereby admit only gas flow through the gas outlet port 60. However, it is appreciated that other prohibiting means may be provided, e.g. forming a maze-like flow path, a multi-chambered flow path, a siphon-like arrangement, etc.

Fitted at a lower portion of housing 52 there is a liquid fuel discharge assembly 70 comprising a confined liquid fuel chamber 72 fitted with an inlet port 74, fitted with a one-way inlet valve 76 to admit liquid flow only in the direction into said chamber 72 and communicating between the inner space 78 of the housing 52 and the inner space of chamber 72. The discharge assembly 70 further comprises a liquid discharge port 80 fitted with a one-way valve 82 for admitting liquid flow in the direction from chamber 72 into the fuel tank (not seen in FIG. 2).

In the present embodiments and in the following embodiments, the one-way valves are in the form of mushroom-type valves comprising a flexible mushroom-like diaphragm member formed with a stamp snapingly received within a suitable receptacle formed at a wall of the liquid fuel discharge assembly 70. It is however appreciated that the one-way valve may be replaced by any suitable one-way valves for ensuring liquid/vapor flow, in a specified one-way. It is also appreciated that the valves may be positioned at various wall portions of the discharge assembly and for example, in FIG. 2A, there is illustrated by dashed lines a secondary outlet port 86 fitted with a one-way discharge valve 88. This arrangement may be in addition or instead of outlet port 80 with its associated one-way valve 82.

The liquid fuel discharge assembly 70 further comprises a fluid propelling mechanism designated 92 comprising a pedal (lever arm) 94 pivoted at 96 to the housing or to any other rigid structure within the fuel tank (not shown) with a bottom end thereof extending towards a bottom end of the fuel tank (see FIG. 1) coupled via a coupling bar 98 to a flexible diaphragm 100 constituting part of the liquid fuel chamber 70.

The arrangement is such that pedal 94 is tiltable about pivot 96 owing to lateral wash forces (responsive to acceleration and de-acceleration of the vehicle, as well as to other travel conditions) applied thereto by liquid fuel 104 within the fuel tank giving rise to corresponding displacement of the diaphragm 100 to respectively increase and decrease the volume of the liquid fuel chamber 72. It is apparent that this arrangement acts as a mechanical pump whereby increasing the volume of the liquid fuel chamber 72 within discharge assembly 70 (FIG. 2B) entails drawing of liquid fuel from the space 78 of the liquid fuel trap into the liquid fuel chamber 72 of the liquid discharge assembly 70 via inlet port 74. In an opposite manner, as illustrated in FIG. 2C, upon pivotal displacement of pedal 94 in an opposite direction, the liquid fuel chamber 72 of the discharge assembly 70 decreases, resulting in discharging of liquid fuel through outlet port 80 into the fuel tank (and optionally also via secondary outlet port 86 illustrated by dashed lines).

It is apparent that an intake stroke (FIG. 2B) occurs when one-way valve 76 opens to facilitate liquid flow therethrough whilst outlet port 80 remains sealed by means of one-way valve 82, whilst in the discharge position as in FIG. 2C, the inlet port 74 remains sealed by one-way valve 76 whilst one-way valve 82 opens to facilitate liquid discharge through outlet port 80.

Figure 3A:
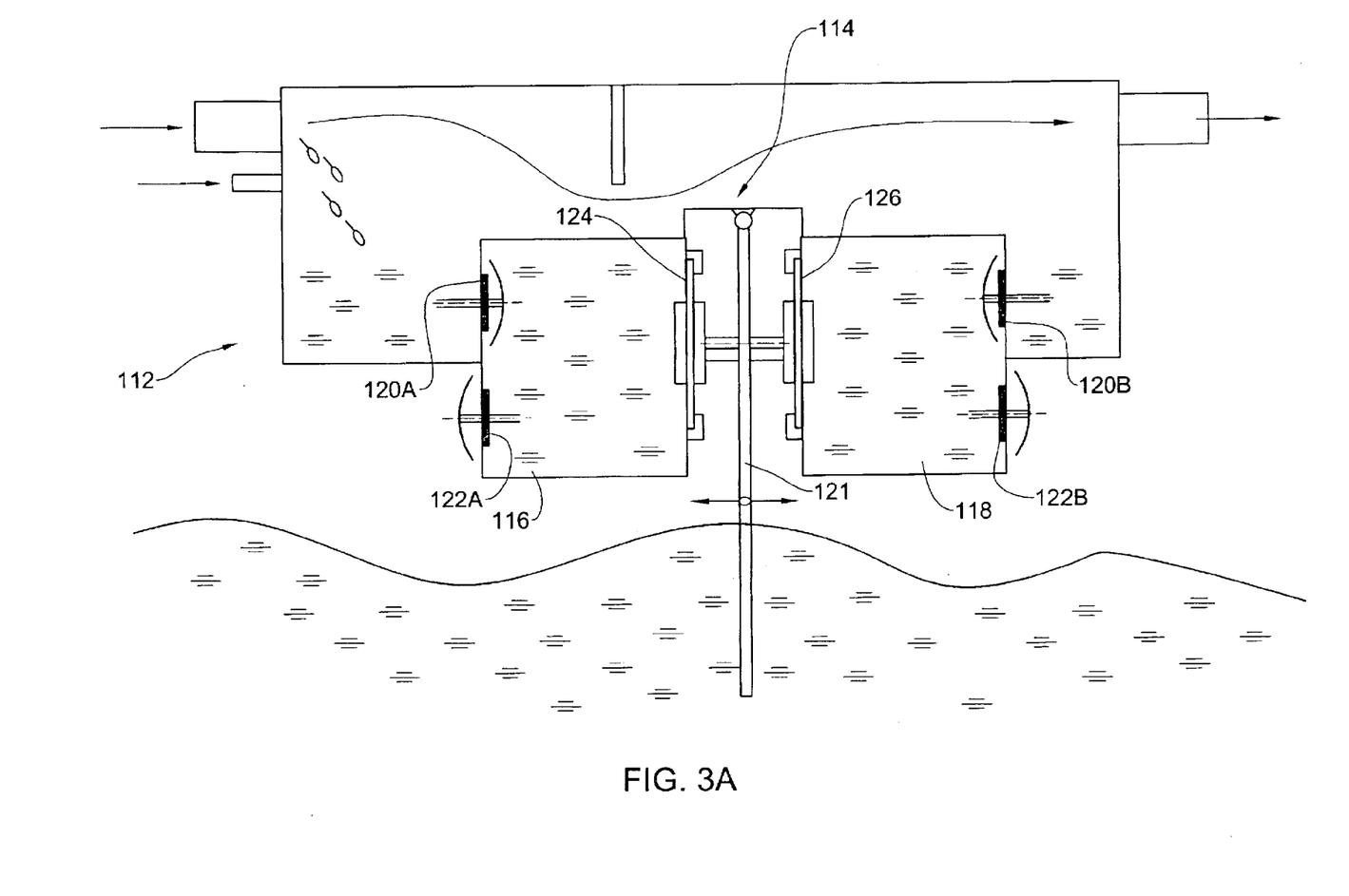
FIG. 3A illustrates the LFT at rest.
Figure 3B:
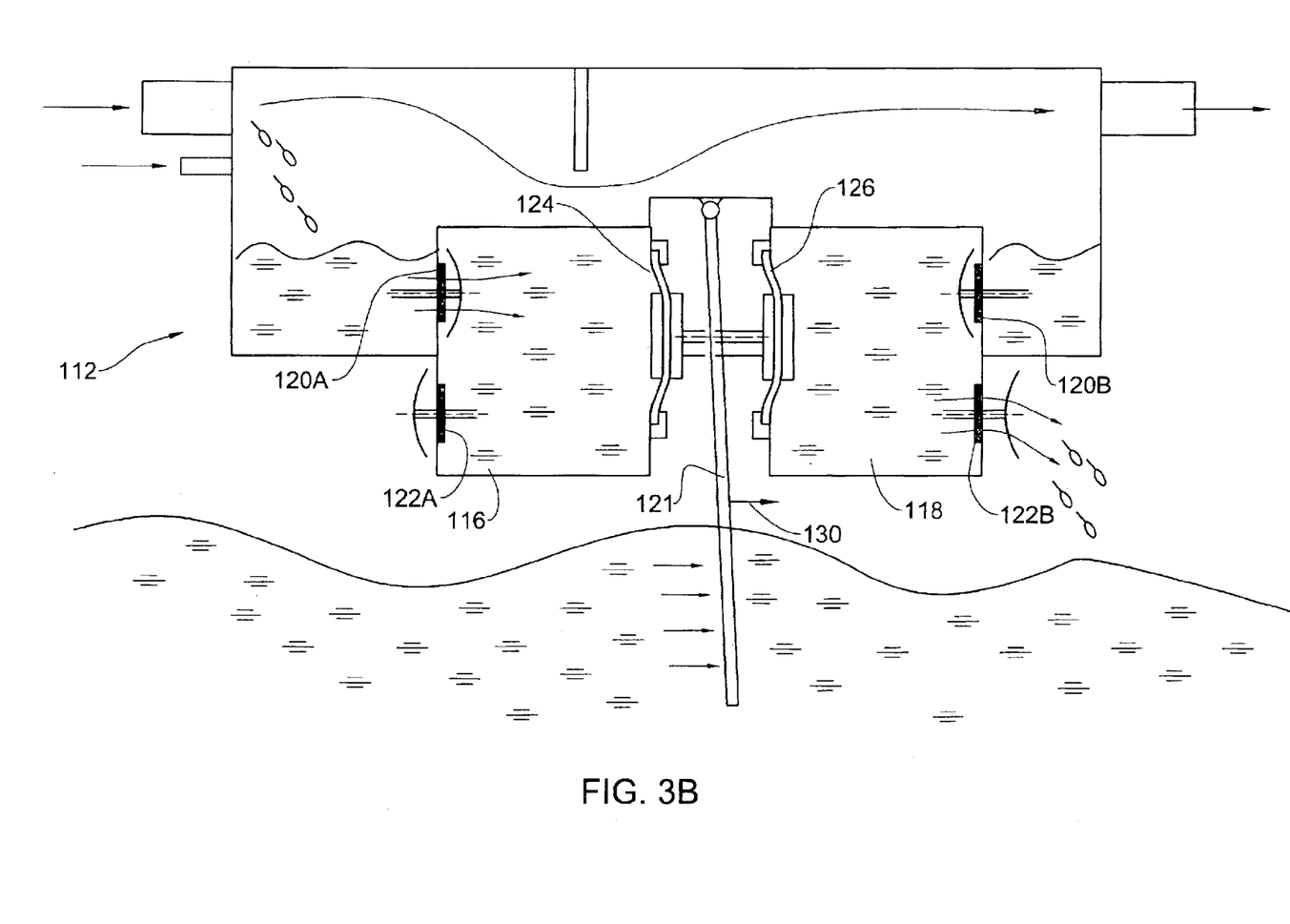
FIG. 3B illustrates the LFT at an intake position.
Figure 3C:
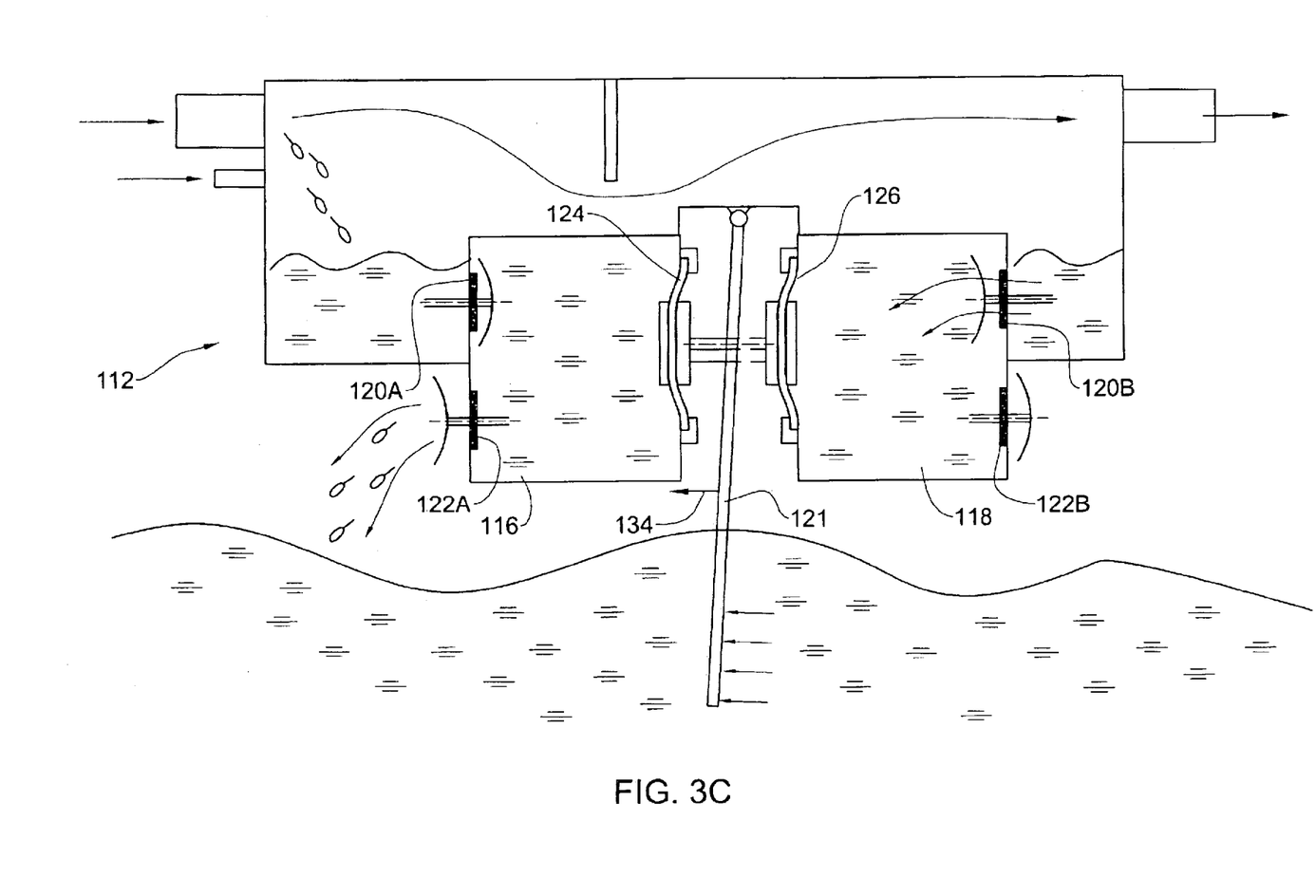
FIG. 3C illustrates the LFT at a discharge position.

Further attention is now directed to the embodiment illustrated in FIGS. 3A to 3C differing in that the liquid fuel discharge assembly 114 comprises two liquid fuel chambers 116 and 118 (each being of similar construction to liquid fuel chamber 72 of FIG. 2) though being activated by a single pedal (level arm) 121, simultaneously coupled to two opposite flexible diaphragms 124 and 126 of the respective chambers 116 and 118. Each of these chambers is respectively fitted with an inlet port 120A and 120B and an outlet port 122A and 122B, respectively, similarly to the arrangement disclosed in connection with FIGS. 2A–2C.

As can further be seen in FIGS. 3B and 3C, displacement of pedal 121 in either direction entails drawing into one of the liquid fuel chambers 116 and 118 and simultaneously liquid discharge into the fuel tank through the other one of liquid fuel chambers 116 and 118. In the position of FIG. 3B, pedal 121 is pivotally displaced in the direction of arrow 130 thereby increasing the volume of the liquid fuel chamber 116 resulting in fuel liquid drawing through inlet port 120A (in this position outlet port 122A remains sealed by its respective one-way valve) and at the same time, the space of liquid fuel chamber 118 decreases thereby propelling liquid to discharge from the liquid fuel chamber 118 through the outlet port 122B into the fuel tank (in this position the inlet port 120B is sealed by its respective one-way valve). A counter position is illustrated in FIG. 3C wherein the pedal 121 is displaced in the direction of arrow 134 thereby drawing liquid into the liquid fuel chamber 118 via inlet port 120D (in this position outlet port 122B remains sealed) and simultaneously, the space of the liquid fuel chamber 116 decreases resulting in discharging of liquid fuel through the outlet port 122A into the fuel tank (in this position inlet port 120A remains sealed).

The arrangement disclosed in FIGS. 3A–3C has the advantage of increased liquid propelling space (constructed by the space of both chambers 116 and 118) and further, in the event of malfunction of one of the chambers it is still likely that the other chamber will continue to function to propel liquid fuel from the liquid fuel trap, through the discharge assembly into the fuel tank.

Figure 4:
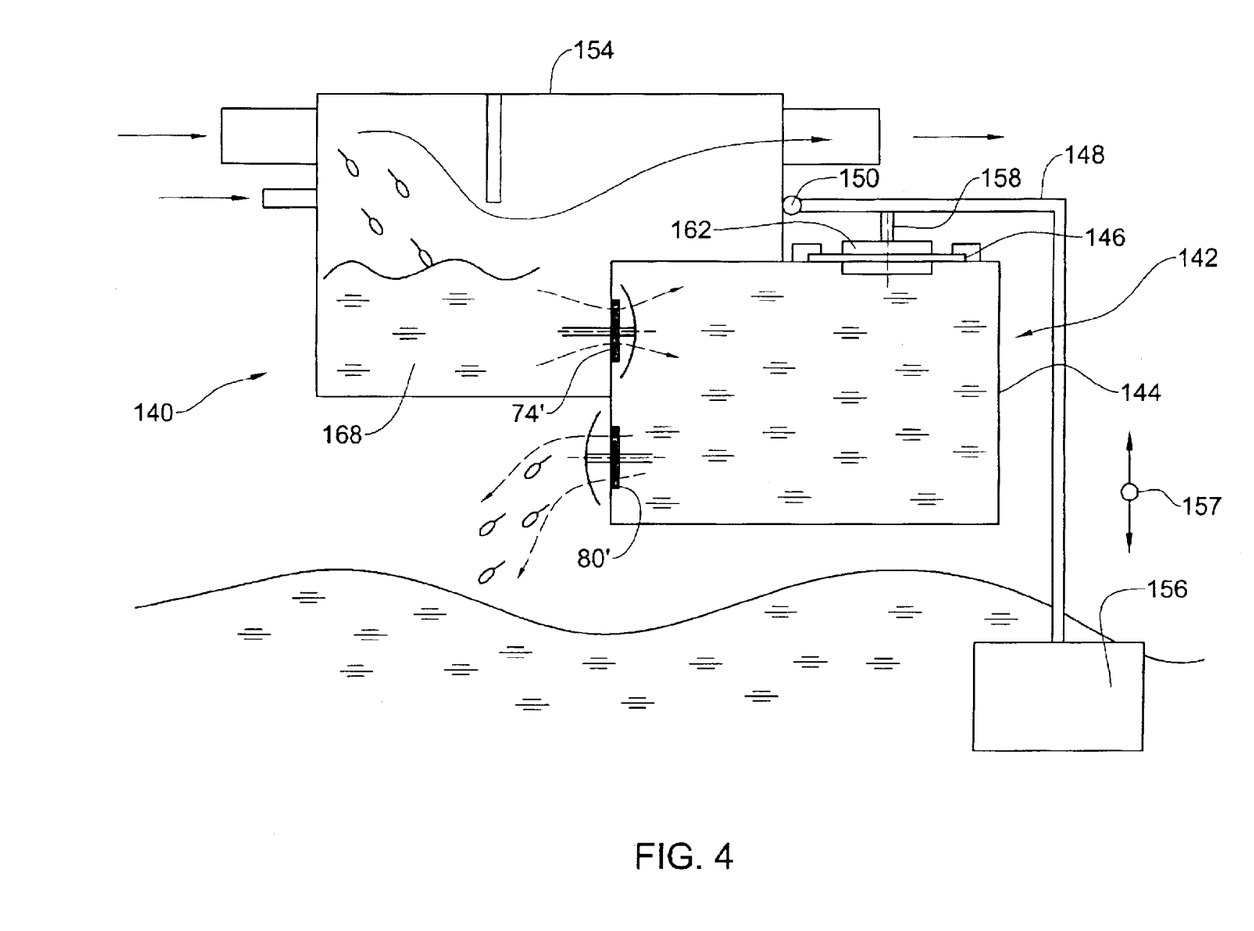
FIGS. 4 to 7 schematically illustrate different embodiments of liquid fuel traps according to the present invention, all illustrated at an intermediate, referred to as a so called rest position.

Further attention is now directed to FIG. 4 illustrating a liquid fuel trap generally designated 140 which is similar to the embodiment illustrated in FIGS. 2A and 2C, the difference residing in the liquid fuel discharge assembly 142 wherein the liquid fuel chamber 144 is fitted at an upper wall portion thereof with a flexible diaphragm 146 articulated to an inverted L-like shaped arm (lever arm) 148 pivoted at 150 to the housing 154 of the liquid fuel trap (or to any other rigid structure) of or within the fuel tank (not shown).

The arm 148 is fitted at a lower end thereof with a float member 156 the arrangement being such that displacement of the membrane 146 occurs responsive to substantially vertical displacement of the float member 156 (in direction of double headed arrow 157) as a result of buoyant forces acting on the float member 156 by liquid fuel waived within the fuel tank.

The flexible membrane 146 is articulated to the arm 148 by a coupling link 158 which, in accordance with an embodiment (not shown), is pivotally coupled at least at one end thereof to the membrane support 162 and to the arm 148.

Operation of the liquid fuel trap 140 is principally similar to that disclosed in connection with the embodiment of FIGS. 2A–2C and for the sake of clarification similar components are designated the same reference numerals with a prime indication. Upon upward displacement of the float member 156 the volume of the liquid fuel chamber 144 increases, resulting in drawing liquid from the confined space 168 of the housing 154 through inlet port 74' (while outlet ports 80' remains sealed). However, upon downward displacement of the float member 156, the inlet port 74' seals whilst the liquid is propelled through the outlet port 80' into the fuel tank (not shown).

As apparent to a person versed in the art, the inlet port 74' and the outlet port 80' are fitted with a one-way valve, which in the present example are mushroom-type valves. Furthermore, the location and position of either of these valves may differ.

Figure 5:
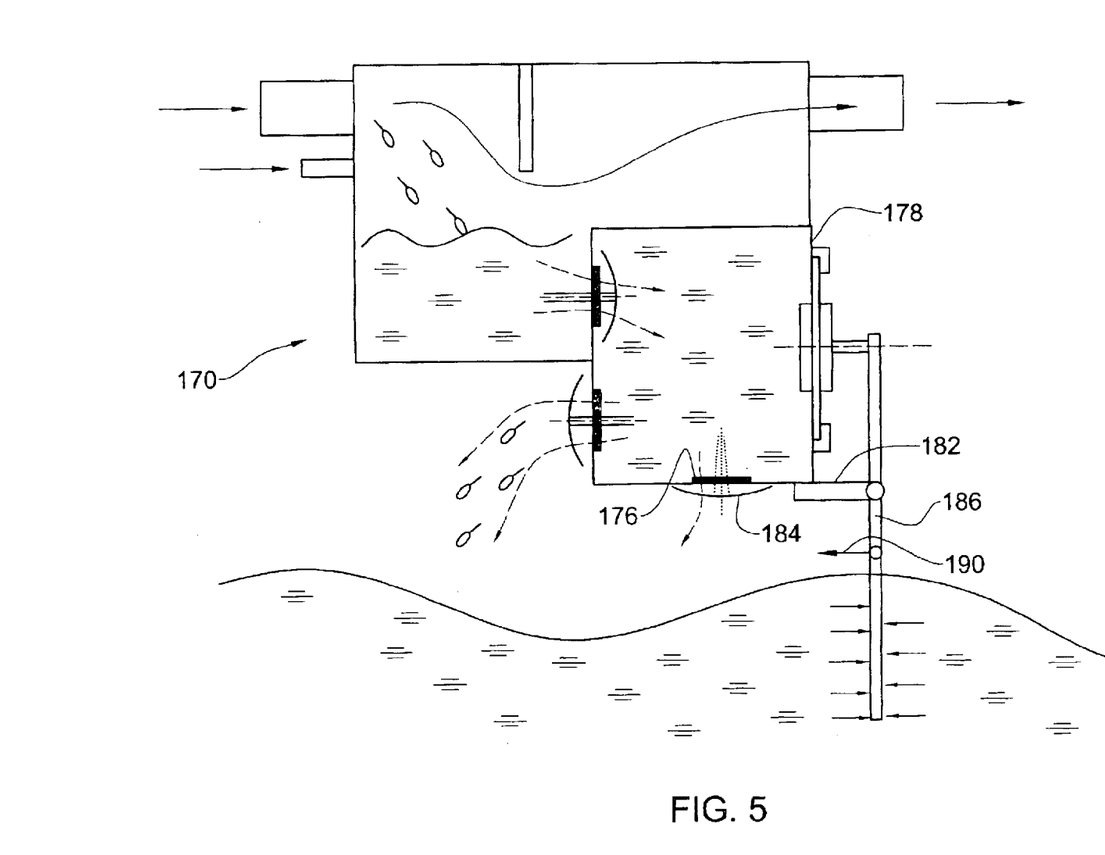

Turning now to the embodiment of FIG. 5, there is disclosed a liquid fuel trap 170 which is similar to the liquid fuel trap 50 of FIGS. 2A–2C, however with an outlet port 176 formed at a bottom wall of the liquid chamber 178 and with a valve peeling member 182 fitted for deforming outlet valve 184 at a closing stroke of the pedal (lever arm) 186, i.e. in its displacement direction of arrow 190 thereby ensuring opening of the outlet port 176 to propel liquid fuel into the fuel tank (not shown). Otherwise, the structure and operation of the liquid fuel trap 170 is similar to that disclosed in connection with the embodiment of FIGS. 2A–2C.

Figure 6:
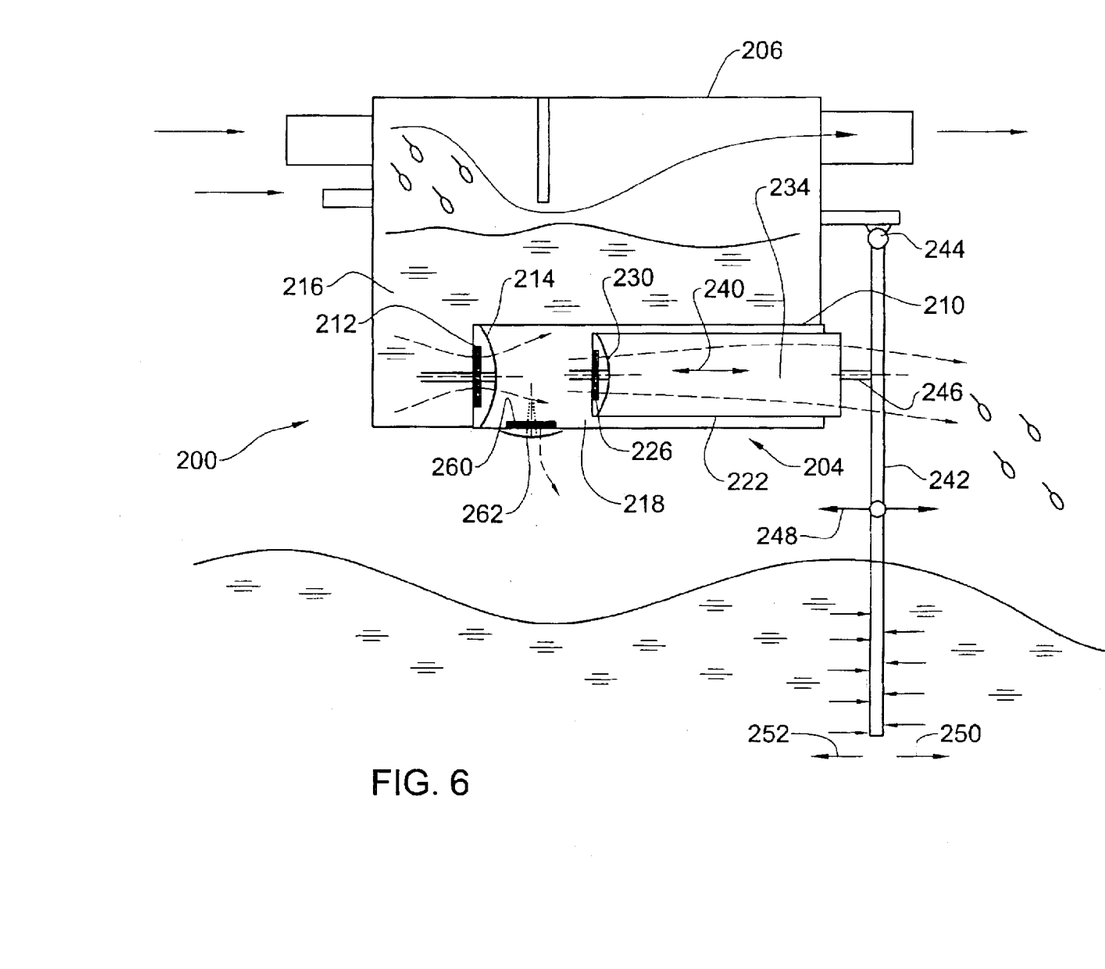

The embodiments illustrated in FIG. 6 illustrates a liquid fuel trap generally designated 200 which differs from the previous embodiments in the general construction of the fluid propelling mechanism generally designated 204 mounted within the housing 206 of the liquid fuel trap.

The fluid propelling mechanism 204 comprises a tubular cylinder casing 210 extending at a bottom portion of the housing 206 and formed at an inner end thereof with an inlet port 212 scalable by a mushroom-type one-way valve 214 admitting liquid flow in the direction from the space 216 of the housing 206 into the liquid fuel chamber 218 of the tubular casing 210.

Slidingly receivable within casing 210 there is a corresponding chamber in the form of an inner tube (piston) 222 coaxially received within casing 210 and fitted with an outlet port 226 sealable by a one-way, mushroom-type valve 230 admitting liquid flow from the confined liquid fuel chamber 218 into the space 234 of the inner tube 222 being in flow communication with the interior of the fuel tank. The inner tube 222 is coaxially displaceable within the casing 210, along arrowed line 240, by means of pedal (lever arm) 242 pivoted at 244 and articulated to the inner chamber 222 by link 246.

The arrangement is such that pivotal displacement of the pedal 242 in the direction of arrows 248, owing to acceleration/de-acceleration forces and liquid fuel waves within the fuel tank result in corresponding axial displacement of the inner tube 222 within the casing 210, in a piston/cylinder like relationship, thereby increasing and decreasing the liquid fuel chamber 218 of casing 210. Accordingly, in a stroke displacing the pedal 242 in the direction of arrow 250 said liquid fuel chamber 218 increases, resulting in drawing liquid from the space 216 of housing 206 via inlet port 212, whilst outlet port 226 remains sealed. Then, upon displacement of pedal 242 in the direction of arrow 252, the liquid fuel chamber 218 decreases, resulting in propelling liquid from the liquid fuel chamber 218 into the space within the inner tube 222 and out to the fuel tank, whilst the inlet port 212 remains sealed.

Illustrated by dashed lines there is an auxiliary outlet port 260 fitted with an outlet mushroom-like sealing valve 262. Upon decreasing of the liquid fuel chamber 218 liquid fuel is propelled through said auxiliary outlet 260.

Figure 7:
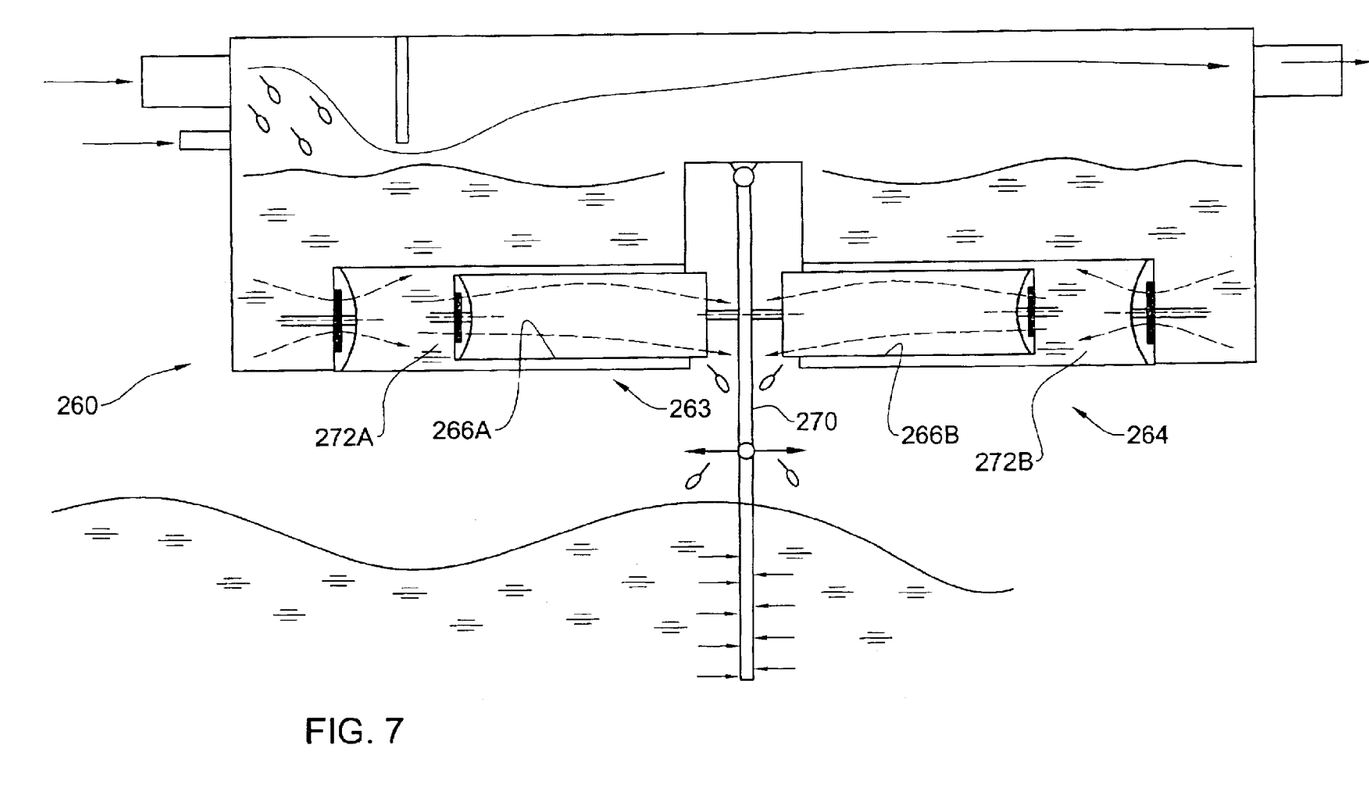

FIG. 7 illustrates an embodiment of having the same principles as that of FIG. 6 wherein the liquid fuel trap 260 comprises a pair of liquid fuel discharge assemblies 263 and 264 acting in opposed senses (similar to the arrangement disclosed in connection with the embodiment described in FIGS. 3A–3C. Each of the fuel propelling mechanisms 263 and 264 comprises an inner tubular member 226A and 226B articulated to a common pedal (lever arm) 270 whereby increasing the liquid fuel chamber 272A entails corresponding decreasing of the liquid fuel chamber 272B and vice versa. Accordingly, drawing liquid fuel into one of said liquid fuel chambers 272A and 272B occurs simultaneously with propelling liquid through the other of said liquid fuel chambers and vice versa.

Figure 8A:
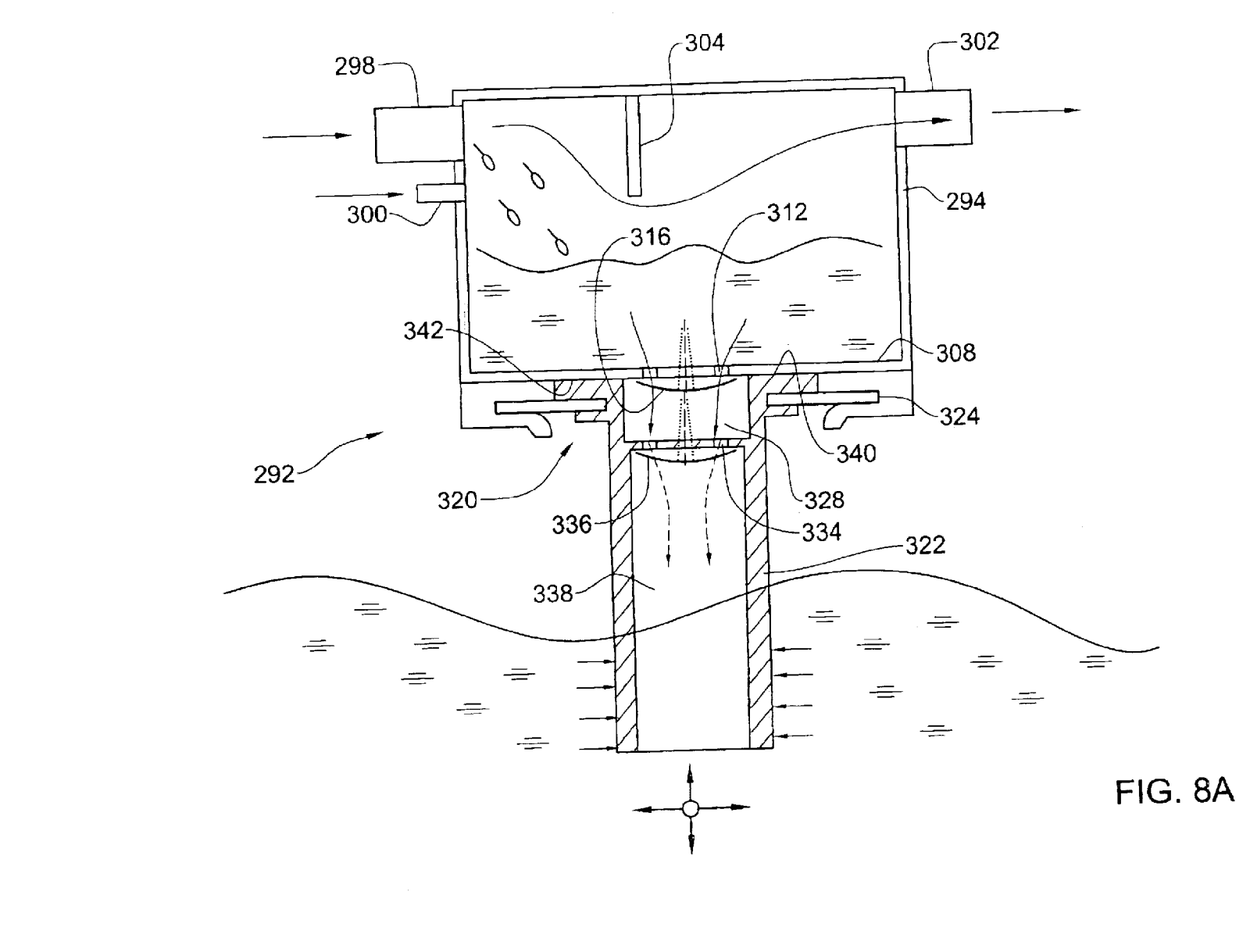
FIG. 8A illustrates the LFT at rest.
Figure 8B:
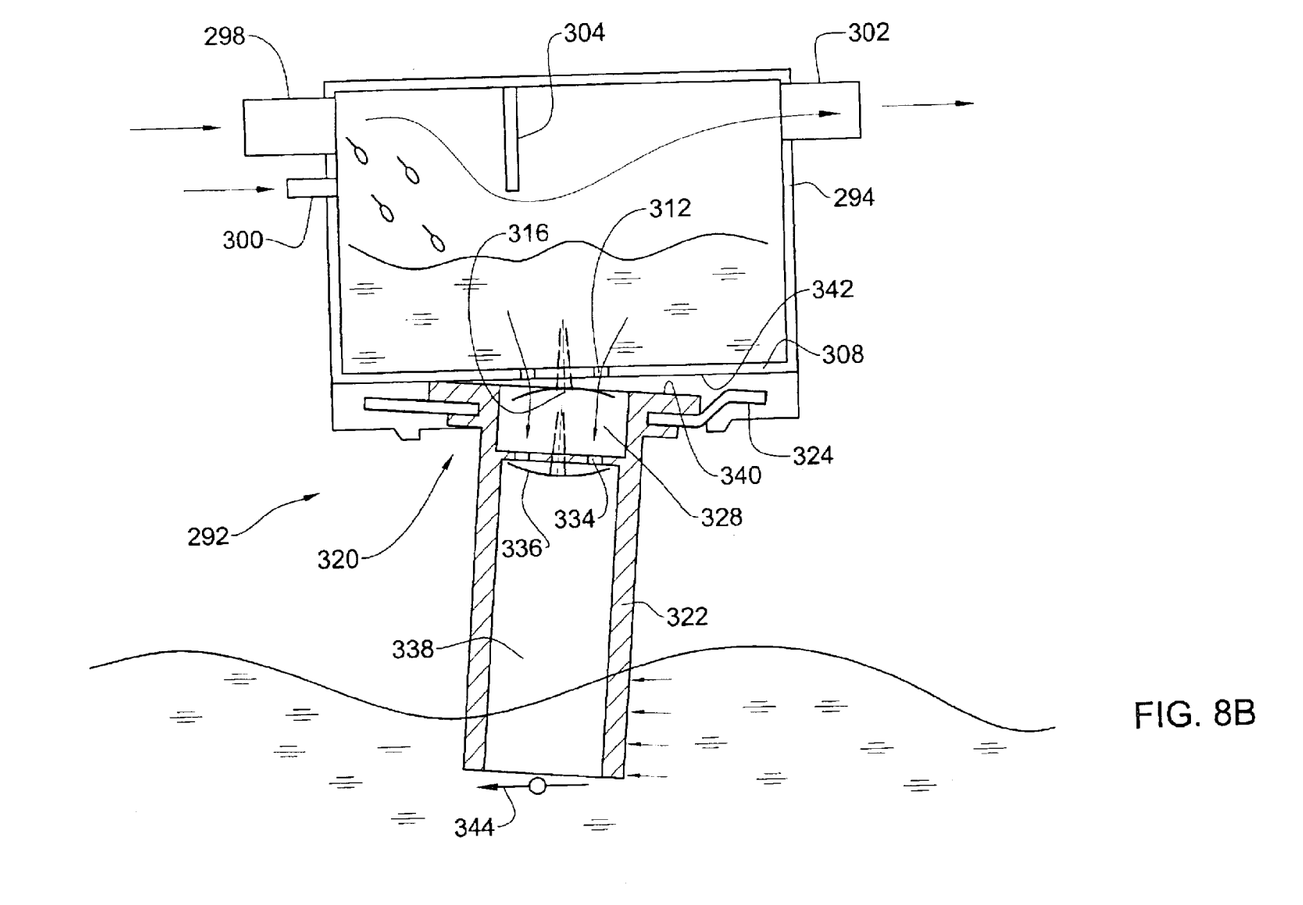
FIG. 8B illustrates the LFT at an intake position.

With further attention to FIGS. 8A and 8B, there is illustrated a liquid fuel trap generally designated 292 comprising a housing 294 fitted with fuel fluid inlet ports 298 and 300 and a gas outlet port 302 with a flow barrier 304 extending therebetween.

Bottom wall 308 of the housing 294 is formed with a liquid port 312 sealable by a one-way mushroom-like type valve 316 constituting part of the liquid fuel discharge assembly generally designated 320.

A tubular member 322 (serving also as a lever arm) is coupled to the housing by a flexible diaphragm 324 which under to pressure retains the tubular member 322 at an essentially upright position, as in FIG. 8A, though under buoyant forces and wash forces the tubular member 322 may slightly displace owing to elasticity of the diaphragm 324, as illustrated for example in FIG. 8B.

The tubular member 322 comprises a confined liquid fuel chamber 328 extending below the port 312 and being in flow communication therewith. It is apparent that whilst outlet port 312 is defined as an outlet port from the housing 294, it in fact serves as an inlet port into the confined chamber 328 and in a corresponding manner, the valve 316 is a one-way inlet valve into said chamber 328.

Formed at a bottom wall of chamber 328 there is a liquid discharge port 334 fitted with a one-way valve 336 for admitting liquid flow only in the direction from the liquid fuel chamber 328 into the fuel tank (not seen) through the tubular segment 338 extending downwardly therefrom.

The liquid fuel trap 292 illustrated in FIG. 8 is illustrated at a so-called rest position where the elastic forces of the membrane 324 act to retain the tubular member 322 in a substantially upright position, with an upper wall surface thereof 340 abutting against a corresponding bottom surface 342 of the housing 294. In this position, the liquid fuel chamber 328 is retained at minimal volume.

However, upon lateral or axial forces applied to the tubular member 322, e.g. by wash forces applied thereto as illustrated in FIG. 8B, the tubular element 322 tilts in the direction of arrow 344, thus increasing the volume of the liquid fuel chamber 328 to include also volume extending between the bottom wall 342 of housing 294 and the upper wall 340 of the tubular member 322, i.e. to include all the space above the flexible diaphragm 324. As the volume of the liquid fuel chamber 328 increases, it gives rise to vacuum forces, entailing drawing liquid fuel into the confined chamber through port 312, whilst retaining the discharge port 334 in a sealed position. Upon ceasing of the forces acting on the tubular member 322 or upon tilt in an opposite direction, or upon buoyant forces acting thereon, the tubular member 322 returns to its position of FIG. 8A, thus reducing the volume of the liquid fuel chamber 328, thereby causing liquid entrapped therein to propel through the discharge port 334 via the tubular segment 338 into the fuel tank. It is apparent that in such a discharge stroke the valve 316 is in its sealed position to prohibit liquid flow in a reverse direction into housing 294.

As mentioned in connection with FIG. 1, it is advantageous that the liquid fuel trap in accordance with the present invention be attached to an inside surface of an upper wall of a fuel tank. This arrangement may be achieved by a variety of different ways, e.g. by providing the housing of the liquid fuel trap with a ring-like member fitted for snap engagement with a corresponding stem member projecting from a top wall surface of the fuel tank (not shown). Other arrangements such as welding, riveting, etc. are also possible.

In general, it is noted that at a normal state of the system, i.e. when the vehicle is still, liquid fuel will normally collected within confined space of the housing. However, upon acceleration or deceleration of the vehicle, or at inclined positions thereof, or upon liquid displacement within the fuel tank, liquid fuel will be drawn by means of the liquid fuel discharge assembly and will then be propelled back into the fuel tank. Only fuel vapor is admitted to flow through the housing into the gas outlet port directed to the fuel vapor treating system (canister). Further as mentioned above, fuel in the form of liquid or droplets in the direction from the fuel tank towards the canister is prohibited, e.g. by barrier wall portions, maize arrangements, siphon traps, float activated sealing arrangements. etc.

Whilst several embodiments have been described and illustrated with reference to some drawings, the artisan will appreciate that many variations are possible which do not depart from the general scope of the invention, mutatis, mutardis.

What is claimed is:

1. A liquid fuel trap for a vehicle's fuel system, the liquid fuel trap comprises a housing adapted for fitting to the vehicle's fuel tank and at least one fuel fluid inlet port connectable to a fuel venting valve system, a gas outlet port connectable to a fuel vapor treating system; and a liquid fuel discharge assembly for discharging liquid fuel into the fuel tank, said liquid fuel discharge assembly fitted with a fluid propelling mechanism responsive to acceleration and buoyant forces and to fuel motion within the fuel tank.

2. A liquid fuel trap according to claim 1, wherein the fluid propelling mechanism is fitted for actively drawing fuel into the liquid fuel discharge assembly, and for discharging liquid fuel into the fuel tank, respectively.

3. A liquid fuel trap according to claim 1, wherein the housing further comprises a connecting arrangement for attaching the device within the fuel tank on an inner surface of an upper wall of the fuel tank.

4. A liquid fuel trap according to claim 1, wherein the liquid fuel discharge assembly is fitted at a lowermost portion of the housing.

5. A liquid fuel trap according to claim 1, wherein the liquid fuel discharge assembly comprises at least one confined liquid fuel chamber, each fitted with at least one inlet port fitted with a one way valve to admit flow only in direction from a confined space of the hosing into said liquid fuel chamber, and at least one liquid discharge port fitted with a one-way valve to admit liquid flow in direction from said liquid fuel chamber into the fuel tank.

6. A liquid fuel trap according to claim 5, wherein the one-way valves are mushroom-type valves.

7. A liquid fuel trap according to claim 5, wherein the fluid propelling mechanism comprises a volume modification mechanism for increasing/decreasing the volume of the liquid fuel chamber of the liquid fuel discharge assembly.

8. A liquid fuel trap according to claim 7, wherein the fluid propelling mechanism comprises a pressure modification mechanism for increasing/decreasing the pressure of the liquid fuel chamber of the liquid fuel discharge assembly.

9. A liquid fuel trap according to claim 7, wherein increasing the volume of the liquid fuel chamber results in drawing liquid into the liquid fuel chamber from the confined space of the housing, and wherein decreasing the volume of the liquid fuel chamber results in expelling liquid fuel from the liquid fuel chamber in the fuel tank.

10. A liquid fuel trap according to claim 7, wherein the volume modification mechanism comprises a resilient wall portion deformable so as to increase/decrease the volume of the liquid fuel chamber.

11. A liquid fuel trap according to claim 7, wherein the volume modification mechanism comprises a piston member and a cylinder, one or both of which encompass the liquid fuel chamber, and at least one of which being axially displaceable with respect to the other, so as to increase/decrease the volume of the liquid fuel chamber.

12. A liquid fuel trap according to claim 11, wherein the cylinder member is fitted with the at least one inlet port; and the piston member is fitted with the at least one liquid discharge port.

13. A liquid fuel trap according to claim 5, wherein the liquid fuel discharge assembly further comprises a lever arm pivotally articulated at one upper end thereof and having a second end thereof extending towards a lower portion of the fuel tank, said arm being articulated to the fluid propelling mechanism.

14. A liquid fuel trap according to claim 13, wherein the lever arm is fitted at or adjacent the second end with a float member, wherein the fluid propelling mechanism is susceptible also to buoyant forces.

15. A liquid fuel trap according to claim 13, wherein the lever arm is fitted at or adjacent the second end with a pedal member, where the fluid propelling mechanism is susceptible to acceleration/deceleration forces and liquid displacement within the fuel tank.

16. A liquid fuel trap according to claim 13, wherein the lever arm is in the shape of a tubular member extending substantially vertically and having a closed upper end, wherein the fluid propelling mechanism is susceptible to buoyant forces and to acceleration/deceleration forces and liquid displacement within the fuel tank.

17. A liquid fuel trap according to claim 5, the liquid fuel discharge assembly comprises two liquid fuel chambers and a common volume modification mechanism, wherein volume increase of one liquid fuel chamber is associated with corresponding volume decrease of the other liquid fuel chamber.

18. A liquid fuel trap according to claim 17, wherein the liquid fuel discharge assembly comprises two opposed liquid fuel chambers having aligned volume modification mechanisms activated by a common lever arm.

19. A liquid fuel trap according to claim 1, wherein at least one inlet port and the outlet port are fitted with a connection nipple connectable to a tube, said connecting nipples being integrally formed with the housing.

20. A liquid fuel trap according to claim 1, wherein the outlet port is formed above the at least one inlet port, so as to prevent liquid splash thereto.

21. A liquid fuel trap according to claim 1, wherein intermediate the inlet port and the outlet port there is formed a barrier wall, so as to prevent liquid splash thereto.

22. A liquid fuel trap device according to claim 1, wherein the confined space of the housing is comprises an expansion chamber designed to allow fuel vapor expansion and accumulation of liquid fuel at a bottom portion thereof.

23. A liquid fuel trap device according to claim 22, wherein the expansion chamber is sized so as to significantly reduce flow velocity of the fuel fluid entering the device via the at least one inlet port.

24. A vehicle's fuel system comprising a fuel tank, at least one fuel venting valve, a fuel vapor recovery system and a liquid fuel trap extending between the at least one fuel valve and the liquid fuel trap, said liquid fuel trap comprising a housing formed with a confined space with at least one inlet port connectable to the corresponding at least one fuel venting valve, an outlet port connectable to the fuel vapor recovery system, and a liquid fuel discharge assembly for discharging liquid fuel into the fuel tank, said liquid fuel discharge assembly fitted with a fluid propelling mechanism responsive to acceleration and buoyant forces and to fuel motion within the fuel tank.

25. A vehicle fuel system according to claim 24, wherein the housing of the liquid fuel trap comprises a connecting arrangement for attachment to an inner surface of an upper wall of the fuel tank.

26. A fuel system according to claim 24, wherein the outlet port of the liquid fuel trap is formed above the at least one inlet port, so as to prevent liquid splash thereto.

27. A fuel system according to claim 24, wherein intermediate the inlet port and the outlet port of the liquid fuel trap, there is formed a barrier wall, so as to prevent liquid splash thereto.

28. A liquid fuel trap for a vehicle fuel tank, comprising a housing fitted for attaching to an inner surface of an upper wall of the fuel tank, said housing further comprising at least one inlet port connectable to corresponding at least one fuel venting valve, an outlet port connectable to a fuel vapor recovery system and a liquid fuel discharge assembly fitted with a fluid propelling mechanism responsive to acceleration and buoyant forces and to fuel motion within the fuel tank, for actively drawing fuel into the liquid furl discharge assembly, and for discharging liquid fuel into the fuel tank, respectively.

* * * * *